US006970181B1

(12) United States Patent
Fadel

(10) Patent No.: US 6,970,181 B1
(45) Date of Patent: *Nov. 29, 2005

(54) BANDWIDTH CONSERVING NEAR-END PICTURE-IN-PICTURE VIDEO APPLICATIONS

(75) Inventor: Charles K. Fadel, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/871,156

(22) Filed: Jun. 18, 2004

Related U.S. Application Data

(63) Continuation-in-part of application No. 09/845,007, filed on Apr. 27, 2001, now Pat. No. 6,816,626.

(51) Int. Cl.[7] .............................................. H04N 7/14
(52) U.S. Cl. ............................... 348/14.01; 348/384.1; 382/282
(58) Field of Search ................................ 348/565, 563, 348/564, 568, 384.1, 385.1, 387.1, 397.1, 348/14.01–14.04, 14.07–14.12, 14.14, 390.1; 382/282, 293, 298, 300; 345/629, 634, 660, 345/666

(56) References Cited

U.S. PATENT DOCUMENTS

| 5,302,968 | A | * | 4/1994 | Heberle ....................... 345/671 |
| 5,351,087 | A | * | 9/1994 | Christopher et al. ........ 348/441 |
| 5,467,144 | A | * | 11/1995 | Saeger et al. ................ 348/566 |
| 5,495,284 | A | | 2/1996 | Katz |
| 5,841,470 | A | | 11/1998 | Welsh |
| 5,896,176 | A | | 4/1999 | Das et al. |
| 6,252,989 | B1 | | 6/2001 | Geisler et al. |
| 6,339,434 | B1 | * | 1/2002 | West et al. ................... 345/667 |
| 6,348,929 | B1 | | 2/2002 | Acharya et al. |
| 6,493,471 | B1 | * | 12/2002 | Zwartenkot et al. ........ 382/298 |

(Continued)

OTHER PUBLICATIONS

"BIGSHOT Screen Magnifier reduce eyestrain and computer vision syndrome," http://www.bigshotmagnifier.com/product.asp, downloaded Apr. 9, 2001 (2 pp.).

(Continued)

Primary Examiner—Paulos M. Natnael
(74) Attorney, Agent, or Firm—Hamilton, Brook, Smith & Reynolds, P.C.

(57) ABSTRACT

A method, system and article of manufacturer is provided to improve the quality of service and image display in videotelephony systems by combining digital zooming techniques and picture-in-picture functionality to conserve bandwidth and enhance selected portions of the video display. A portion of the videotelephony image is selected to be zoomed and re-transmission of the videotelephony image source is limited by preventing instructions to zoom the defined portion from being transmitted to the videotelephony image source. Zooming of the defined portion is performed by using an interpolation-based digital zooming technique independent of the zooming capabilities of the videotelephony image source. The zoomed portion is then displayed in a window on a display screen. The zoomed portion can be displayed in an in-place window over the defined portion such that the zoomed portion overlaps adjacent non-zoomed portions of the videotelephony image or in a separate floating window on the display screen. The separate window can be a floating window or a fixed/docked window on the display screen. Additionally, a freeze-frame technique can be used to capture ("freeze") the zoomed image such that re-transmission of the image source does not overwrite the zoomed image. The same techniques used to create a first zoomed image window can be used to create multiple zoomed image windows.

41 Claims, 5 Drawing Sheets

U.S. PATENT DOCUMENTS

| | | |
|---|---|---|
| 6,523,022 B1 | 2/2003 | Hobbs |
| 6,597,736 B1 * | 7/2003 | Fadel .................... 375/240.01 |
| 6,807,308 B2 * | 10/2004 | Chui et al. .................. 382/240 |
| 6,829,391 B2 * | 12/2004 | Comaniciu et al. ......... 382/243 |

OTHER PUBLICATIONS

Braun, G., "Software Design—Screen Loupe for Windows," http://111.gregorybraun.com/Loupe.html, downloaded Apr. 4, 2001.

"Ezenia!—Products—Encounter products," http://111.ezenia.com/products/Encounter-overview.cfm, downloaded Apr. 4, 2001.

"Ezenia!—Products—Ezenia!Interactivity—Product Overview," http://www.ezeniz.com/products/EIproductoverview.cfm, downloaded Apr. 4, 2001 (1 p.).

Ezenia!—Products—InfoWorkspace, http://www.ezenia.com/products/iws.cfm, downloaded Apr. 4, 2001 (1 p.).

"See the Polycom Video Product Family," http://www.polycom.com/products/video_family.html, downloaded Apr. 4, 2001 (2 pp.).

"Polycom ViewStation FX," product data sheet, 2000 (2 pp.).

"Polycom VS4000," product data sheet, 2001 (3 pp.).

"PictureTel 900 Series Collaboration System," http://www.picturetel.com/pdg/900series/featuredescriptions.pdf, downloaded Apr. 30, 2001 (6 pp.).

"Intel®Proshare® Video System—Technical Specs," http://support.intel.com/support/proshare/conferencing/8186.htm, downloaded Apr. 4, 2001 (5 pp.).

Aramini, M.J., "Efficient Image Magnification by Bicubic Spline Interpolation," http://www.ultranet.com/~aramini/design.html, downloaded Apr. 10, 2001 (3 pp.).

Microsoft Corporation, "About Magnifier—Microsoft Magnifier Version 1.0," 1997,1998 (1 p.).

* cited by examiner

BANDWIDTH CONSERVING NEAR-END PICTURE-IN-PICTURE VIDEO APPLICATIONS

RELATED APPLICATION

This application is a continuation-in-part of U.S. application Ser. No. 09/845,007, filed Apr. 27, 2001 now U.S. Pat. No. 6,816,626. The entire teachings of the above application are incorporated herein by reference.

BACKGROUND OF THE INVENTION

This invention relates generally to conserving bandwidth in videotelephony systems, and more specifically to conserving bandwidth in videotelephony systems by using digital zooming and picture-in-picture functionality.

Videotelephony provides symmetric audio and video streaming for an image source across a communications network. The video stream may be compressed using a variety of compression/transmission standards, including: MPEG-4, H.323, H.261 and H.263. These compression standards provide for some conservation of bandwidth, but since videotelephony relies on telephony links that can be limited to 56 Kbs or lower (e.g., cellular) the bandwidth for videotelephony may remain severely constrained in some instances. Constrained bandwidth causes image quality to suffer, often preventing viewers from detecting important visual queues from images displayed in the videotelephony system.

The ability to zoom the image on a videotelephony display can increase the viewer's ability to see detail, but at the cost of requiring a re-transmission of the newly zoomed image. This re-transmission consumes bandwidth, thereby reducing the available refresh frequency, and thus reducing the quality of the image displayed.

Images in videotelephony systems can be captured using standard pan-tilt-zoom cameras having optical and/or digital zooming capabilities. Once captured, images in videotelephony systems are digitally transmitted from the far-end (i.e., camera-end) to the near-end (i.e., display-end). Certain videotelephony display systems implement picture-in-picture technology, this is often used to view the near-end image as it is being seen by the far-end display of the videotelephony link and visa versa. Using picture-in-picture technology a viewer can track how they are being seen. Re-transmissions based upon re-aiming and re-zooming the cameras in a videotelephony system consume a significant amount of videotelephony bandwidth.

Intel Corporation of Santa Clara, Calif., USA provides videotelephony capabilities through its ProShare® Video Conferencing Systems. PictureTel Corporation of Andover, Mass., USA has developed the PictureTel 900 Series Collaboration System for video conferencing. Polycom of Milpitas, Calif., USA provides video conferencing solutions for personal, conference room and board room use. Ezenia! Inc. of Burlington, Mass., USA provides video conferencing through its Encounter family of products. These existing systems provide limited zooming and some picture-in-picture functionality, but none conserve bandwidth by providing digital zooming in a videotelephony system using near-end picture-in-picture functionality.

Video screen magnifiers exist to digitally zoom portions of video display (e.g., computer) screens. The Microsoft Magnifier Version 1.0 (Windows 98 Operating System) provides zooming by splitting the screen and displaying a magnified (zoomed) version of the portion of the screen having mouse cursor or keyboard focus. The desired effect is to have the mouse cursor act as a magnifying glass as it moves over portions of the screen. Alternate versions of screen magnifiers have been developed, for example The Bigshot Magnifier (www.bigshotmagnifier.com) will zoom the full display screen or the active window on the display screen. The Screen Loupe Magnification Utility (www.gregorybraun.com) provides a separate floating window that magnifies a viewer defined area under the mouse cursor. These screen magnifiers provide some rudimentary screen zooming, but are not integrated into a videotelephony system, lower screen resolution and do not conserve bandwidth by providing digital zooming in a videotelephony system using picture-in-picture functionality.

SUMMARY OF THE INVENTION

Providing an improved videotelephony experience by conserving bandwidth while enhancing various portions of the displayed image has proven to be a difficult problem. The bandwidth constraints of existing videotelephony systems cause quality of service problems and diminish the viewer experience. These problems include poor image quality do to a lack of sufficient bandwidth to handle re-transmissions for zooming, latency in receiving the re-transmission and images that are displayed too small to read important facial and other body expressions.

Accordingly, the present invention improves the quality of service and image display in videotelephony systems by combining digital zooming techniques and picture-in-picture functionality to conserve bandwidth and enhance selected portions of the video display. The present invention defines a portion of the videotelephony image to be zoomed and limits the re-transmission from the videotelephony image source by preventing instructions to zoom the defined portion from being transmitted to the videotelephony image source. Zooming of the defined portion is performed on the near-end by using an interpolation-based digital zooming technique (e.g., spline interpolation) independent of the zooming capabilities of the videotelephony image source. The zoomed portion is then displayed in a window on a viewer's display screen.

The zoomed portion can be displayed in an in-place window over the defined portion such that the zoomed portion overlaps adjacent non-zoomed portions of the videotelephony image or in a separate floating window on the display screen. The separate window can be a floating window or a fixed/docked window on the display screen. Additionally, a freeze-frame technique can be used to capture ("freeze") the zoomed image such that re-transmission of the image source does not overwrite the zoomed image.

A method for conserving bandwidth in a transmission of a videotelephony image from a far-end video image source to a near-end includes defining at least two portions of the videotelephony image to be zoomed; zooming the defined portions by using an interpolation-based digital zooming technique at the near-end, independent of the zooming capabilities of the videotelephony image source and without requiring re-transmission of the zoomed portions from the videotelephony image source; and displaying each of the zoomed portions in a corresponding window.

According to another aspect, the videotelephony image can be acquired with a far-end videotelephony image source that includes a wide-angle lens.

According to another aspect, the videotelephony image can be selected from at least one of multiple image streams, each image stream encoded using a different type codec.

According to yet another aspect, defining the portions to zoom includes defining a first portion of the videotelephony image corresponding to a first image stream and defining a second portion of the videotelephony image corresponding to a second image stream. The first and second zoomed portions can be displayed on correspondingly different display screens or on the same display screen.

Benefits of the present invention include allowing multiple viewers of a single source image to independently zoom on desired portions of the image without affecting the other viewers. Re-transmission bandwidth is conserved as no additional video stream is sent when viewers zoom because the zooming is done digitally, at the near-end, not by the camera at the far-end. Additionally, because zooming is performed "locally", on the near-end, viewers using picture-in-picture functionality to track how they are being seen will not be able to detect whether they are being zoomed or not.

This application is related to formerly filed U.S. patent application having Ser. No. 09/537,926, filed Mar. 29, 2000, entitled THROUGHPUT ENHANCED VIDEO COMMUNICATION, now U.S. Pat. No. 6,597,736, which is assigned to the assignee of the present invention, the entire teachings of which are incorporated herein by reference in their entirety.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
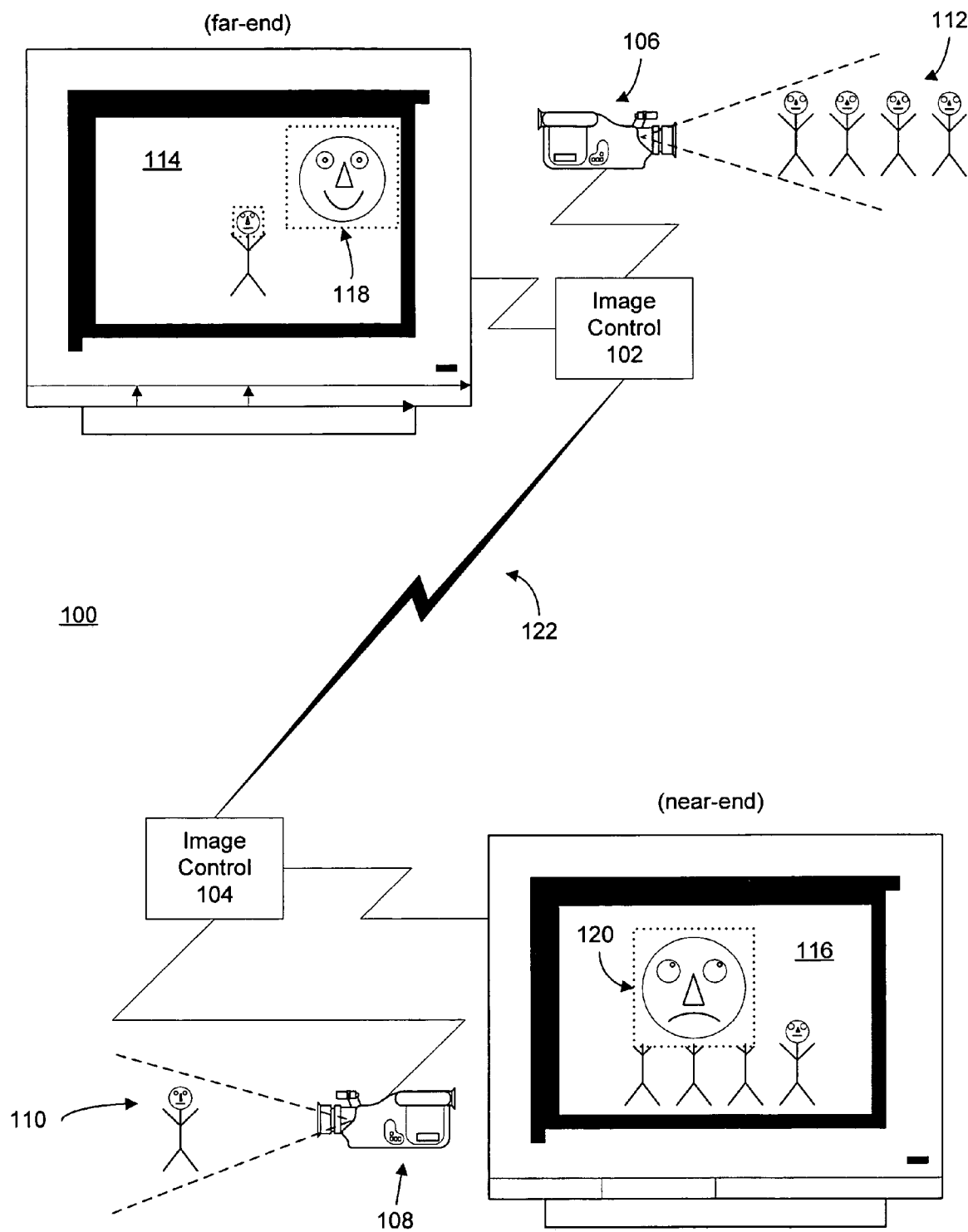
FIG. 1 illustrates a videotelephony system on which an embodiment of the present invention is implemented.

FIG. 1 illustrates a videotelephony system on which an embodiment of the present invention is implemented. Video telephony system 100 is comprised of video cameras 106 and 108. For purposes of illustration, video camera 108 will be referred to as being part of the near-end of videotelephony system 100 and video camera 106 will be referred to as being part of the far-end of videotelephony system 100. The near-end and far-end roles are for illustration purposes only, either role of video camera 106 or 108 can be reversed as videotelephony systems are symmetric by nature. Video cameras 106 and 108 capture images, for example a group of people represented by far-end image source 112 and an individual person represented by near-end image source 110.

Captured images are transmitted and received over connection link 122 using image control 102 and 104. Many communication protocols have been developed to efficiently transmit audio and video data for videotelephony applications (e.g., MPEG-4, ITU H.323, ITU H.261 and ITU 263). The term "videotelephony" as used herein includes video conferencing, video streaming, video-on-demand, video surveillance and any other type of video communications over a network. The present invention operates independently of the transmission protocol used. Image control 104 and 106 process incoming and outgoing video streams, operate video cameras 106 and 108, process videotelephony instructions, and control video displays 114 and 116.

Video display 114 and 116 provide video display screens for digital video images. The video display 114 and 116 can be divided in separate windows for viewing independent views of images using picture-in-picture techniques. Far-end video display 114 can display a full screen view of image source 110 and a separate, digitally zoomed, view of a portion of image source 110 in zoomed window 118. Zoomed window 118 represents a fixed, or docked, display window, the viewer can place zoomed window 118 in a corner, or along the edge, of video display 114 such that it does no obscure the main view of image source 110. This is useful when visual feedback from both a non-zoomed view and a zoomed view is desired simultaneously. Alternately, a zoomed window can we configured to float, or overlay, portions of the main view of an image source. Zoomed window 120 represents this configuration for image source 112. Here video display 116 is displaying image source 112 comprising a group of four individuals. The viewer of video image 116 has decided that a closeup view of the second individual from the left would enhance their videotelephony experience, therefore they have decided to zoom in on that individual's face. Zoomed window 120 shows more detail of source image 112, thus allowing the viewer to infer more information regarding the content of the videotelephony transmission.

For example, the individual represented by image source 110 may be making a proposal to the group represented by image source 112. As can be seen by zoomed window 118 the individual represented by image source 110 is clearly happy with the proposal, but as can be clearly seen from zoomed window 120, at least one individual from the group represented by image source 112 is not responding favorably to the proposal.

For the sake of clarity the use of near-end picture-in-picture functionality for viewing what the far-end is seeing is not illustrated in FIG. 1.

Figure 2:
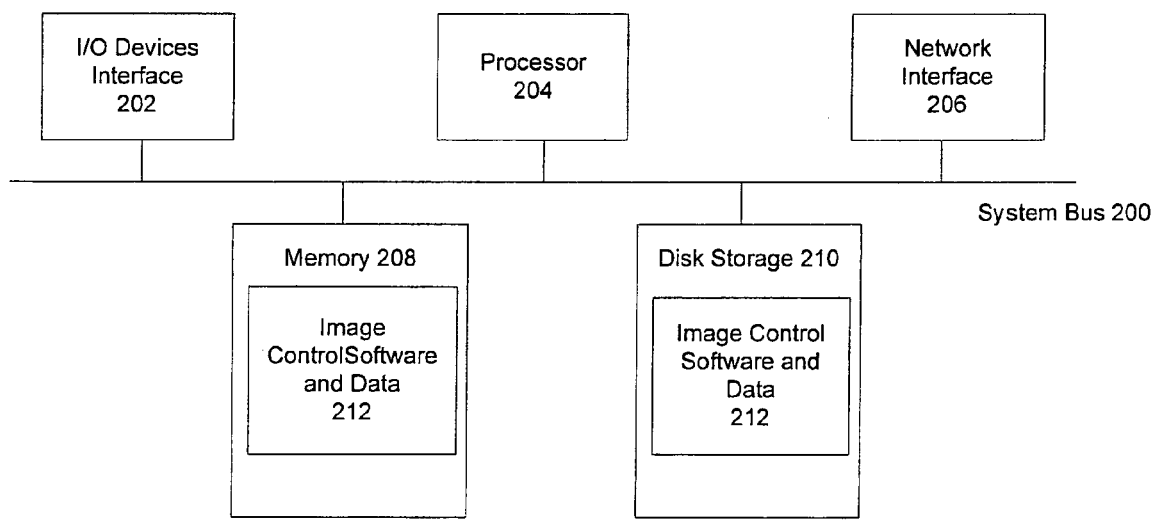
FIG. 2 is a diagram of the internal structure of an image control resource configured according to an embodiment of the present invention.

FIG. 2 is a diagram of the internal structure of an image control resource configured according to an embodiment of the present invention. Image control 102 and 104 contain a system bus 200; a bus is a set of hardware lines used for data transfer among the components of a videotelephony image control resource (e.g., image control 102 and 104). A bus is essentially a shared channel that connects different components of the videotelephony image control resource (e.g., I/O devices, processors, network interfaces, disk storage and memory) and enables the different components to transfer information. Attached to system bus 200 is I/O devices interface 202, which allows input and output devices, such as video displays, video cameras, keyboards, pointing devices and the like to communicate with other components on system bus 200. A processor, such as processor 204, executes instructions and accesses data stored in memory 208. Network interface 206 provides a link to an external network, for example the connection link 122 of videotelephony system 100, thus allowing videotelephony resources such as image control 102 and 104 to communicate with each other. Memory 208 stores computer software instructions and data structures used to implement an embodiment of the present invention (e.g., image control software and data 212). Disk storage 210 provides non-volatile storage on videotelephony system 100 image control resources to store instructions and data, for example image control software and data 212. The combination of components connected to System Bus 200 provide bandwidth conserving near-end picture-in-picture videotelephony.

Image control software and data 212 provide instructions and data that process incoming and outgoing video streams, operate video cameras 106 and 108, process videotelephony instructions, and control video displays 114 and 116. In an embodiment of the present invention videotelephony instructions are used to define a portion of the videotelephony image to be zoomed. Portions to be zoomed can be definition using conventional area definition techniques (e.g., bitmap outlining tools, graphic lasso tools). Instructions can specify the magnification/zoom level, where the zoomed window will display and whether the zoomed window is floating or docked. Additionally, videotelephony instructions can specify whether the zoomed window is to display the image as a freeze-frame, or whether it is to refresh as additional video streaming is received. The present invention performs post-processing of the digital video stream, this processing is independent of whether the video camera has performed a zoom (digital or optical) or not. Therefore, there is no requirement for re-transmission of portions of the image that the viewer as requested to be zoomed, the far-end system does not even have to know that the invention is processing on the near-end.

Figure 3:
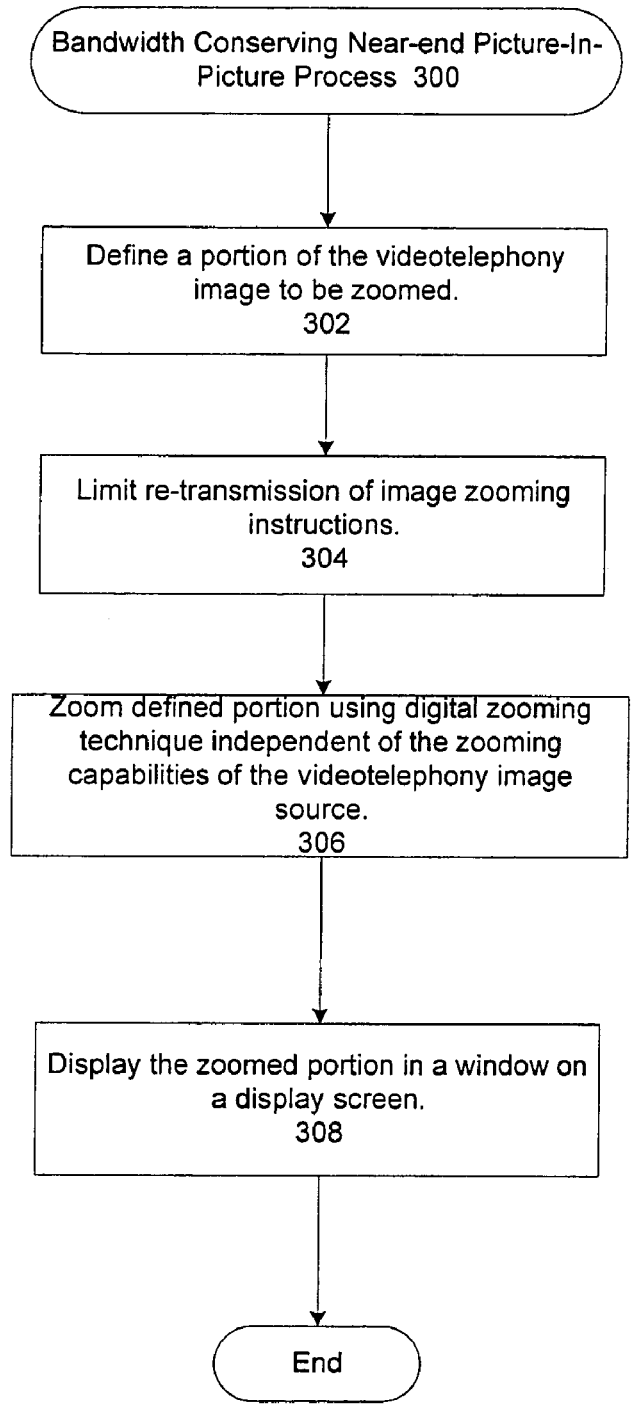
FIG. 3 is a flowchart of a bandwidth conserving near-end picture-in-picture process configured according to an embodiment of the present invention.

FIG. 3 is a flowchart of a bandwidth conserving near-end picture-in-picture process (Step 300) configured according to an embodiment of the present invention. The process comprises defining a portion of the videotelephony image to be zoomed (Step 302). This can be done using conventional selection techniques that allow the viewer to select a portion of the image to be zoomed. One example of a selection tool is the Microsoft Paint program for Windows 98. Paint offers a free-hand selection tool and a two-way horizontal/vertical line selection definition tool capable of being manipulated by the mouse, keyboard or joystick. Each tool delineates a portion of a graphic/video image for further processing (e.g., digital zooming). Pre-defined selection templates, created to help viewers identify particularly interesting portions of an image, can be used to assist the user in defining the portion of the image to be zoomed. Co-pending U.S. patent application Ser. No. 09/537,926, filed Mar. 29, 2000, entitled THROUGHPUT ENHANCED VIDEO COMMUNICATION, now U.S. Pat. No. 6,597,736, describes a series of such templates to define a face and eyes-nose-mouth regions for use in defining portions of video images.

At Step 304 instructions to zoom the defined portion of the video image are generated and sent to the near-end videotelephony image control (e.g., image control 104), but not to the far-end videotelephony image control (e.g., image control 102), thus limiting the re-transmission from the videotelephony image source by preventing instructions to zoom the defined portion from being transmitted to the far-end videotelephony image control.

Zooming of the defined portion (Step 306) is provided by using an interpolation digital zooming technique (e.g., bicubic spline interpolation) independent of the zooming capabilities of the videotelephony image source camera. Most cameras have two types of zoom capabilities: optical zoom and digital zoom. In optical zoom mode the camera uses a moveable lense to adjust the focal length (the distance from the lends to the sensor) to bring the subject image closer or move it farther away. In digital zoom mode the camera uses an interpolation process to take the picture that the camera is capturing, remove other parts of it, and enlarge other parts of it. Interpolation-based digital zooming techniques remove some components (e.g., pixels) of the image to be zoomed and replace the missing components with calculated components based upon attributes of non-removed, surrounding, components. Interpolation techniques can remove alternating lines, alternating columns or other patterns of the image that are calculated to produce the least visual distortion.

Displaying the zoomed portion in a window on a display screen (Step 308) allows the viewer to see the results of the zoomed image. The zoomed portion can be displayed in an in-place window over the defined portion such that the zoomed portion overlaps adjacent non-zoomed portions of the videotelephony image or in a separate floating window on the display screen. The separate window can be a floating window or a fixed/docked window on the display screen. Additionally, a freeze-frame technique can be used to capture the zoomed image such that re-transmission of the image source does not overwrite the zoomed image. This resulting still-shot of the zoomed image can be saved and/or printed for future use.

The present invention is not limited to a single zoomed window per display screen, the same techniques used to create a first zoomed image window can be used to create multiple zoomed image windows. It is contemplated that in a videotelephony system it will often be desirable to view multiple zoomed images simultaneously. Just as the zoomed image windows can overlap the full screen view of an image source, the zoomed image windows can also overlap themselves. This allows for maximum flexibility in the allocation of the display screen space.

Figure 4:
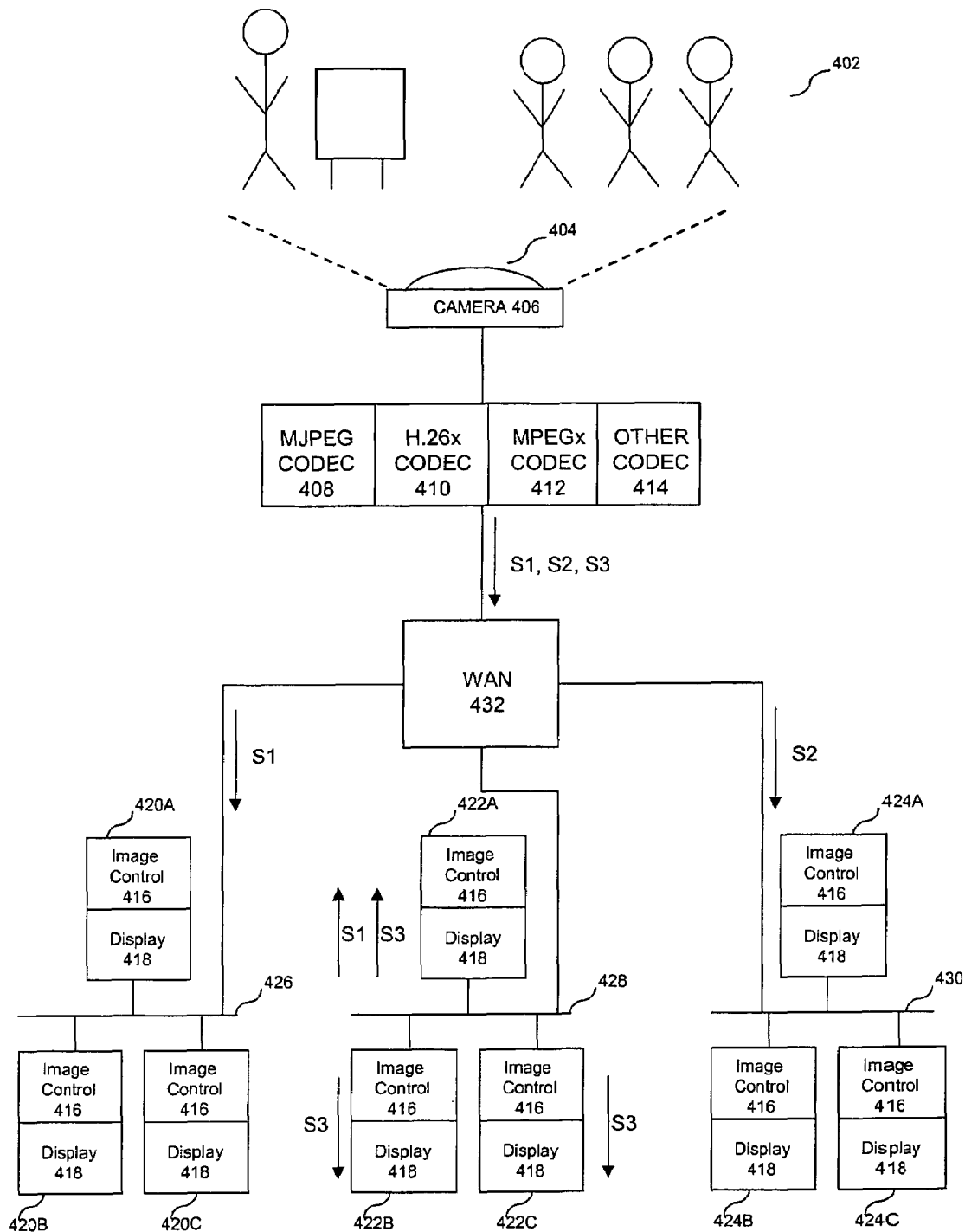
FIG. 4 illustrates a videotelephony network arrangement on which another embodiment of the present invention is implemented.

FIG. 4 shows a videotelephony network arrangement on which another embodiment of the present invention is implemented. The arrangement includes a camera 406 with a wide-angle lens 404 (e.g., a "fish-eye" type lens). For purposes of illustration, the camera 406 is referred to as being part of the far-end. The camera 406 is illustrated capturing an example image 402 of a classroom with a teacher and several students.

For simplicity in illustration only, corresponding camera, image control and display equipment to provide capture, transmission, processing and display of video images in the reverse direction (i.e., from the near-end to the far-end) is not shown but can be readily understood from the embodiment described with respect to FIG. 1.

The captured image is transmitted over wide area network 432 to near-end local networks 426, 428, 430. The local networks can be wired or wireless. In this arrangement, the captured image is encoded by an encoder that uses one or more of the following codecs: motion JPEG codec 408, H.26x codec 410, MPEGx codec 412. Motion JPEG provides relatively low bit rate video that is useful for such applications as video monitoring and surveillance. H.26x is used for two-way conferencing. MPEGx can be used for communication applications such as live streaming and video-on-demand. Video streams of encoded images corresponding to the output of each codec are illustrated as streams S1, S2, S3. The codec types illustrated are by example only; it should be understood that other codec types can also be used to provide video streams, as represented by other codec 414. In other embodiments, the codecs can be embedded with the camera 406.

Each of the local networks 426, 428, 430 includes corresponding nodes or devices (420A, 420B, 420C; 422A, 422B, 422C; 424A, 424B, 424C) that are configured to process and display video streams received from the far-end. In particular, each device includes image control 416 and video display 418 which operate in the same manner as corresponding image control 104, 106 and video displays 114, 116 (FIG. 1).

For purposes of illustrating principles of the invention, devices 420A, 420B, 420C on local network 426 receive video stream S1 corresponding to motion JPEG encoding. The devices 420A, 420B, 420C may, for example, support different users in security operations, such as on-campus security personnel, police, and fire personnel. Devices 424A, 424B, 424C on local network 430 receive video stream S2 corresponding to H.26x encoding. These devices 424A, 424B, 424C may correspond to several students in a distance learning application that have a need for a two-way conferencing capability. On local network 428, device 422A receives both video streams S1 and S3 (corresponding to MPEGx encoding) and devices 422B, 422C receive video stream S3. The devices that receive video stream S3 may correspond to teachers, students and parents that are supported in a video-on-demand presentation. Device 422A that is illustrated receiving additional stream S1 may be supporting, for example, security personnel having a need to perform monitoring of students from stream S1 while also viewing the video-on-demand stream S1 viewed by the others.

It should be understood that other arrangements can be configured in which the devices receive any combination of the video streams S1, S2, S3 or other streams, regardless of the local network 426, 428, 430 to which each device is connected.

In the arrangement of FIG. 4, whether a device is receiving one or more video streams, the principles described above in relation to FIGS. 1 to 3 apply. That is, one or more portions of the videotelephony image can be defined and zoomed at the near-end, independent of the pan, tilt and zoom capabilities of the far-end videotelephony image source, and without requiring re-transmission of the zoomed portions from the videotelephony image source.

Figure 5A:
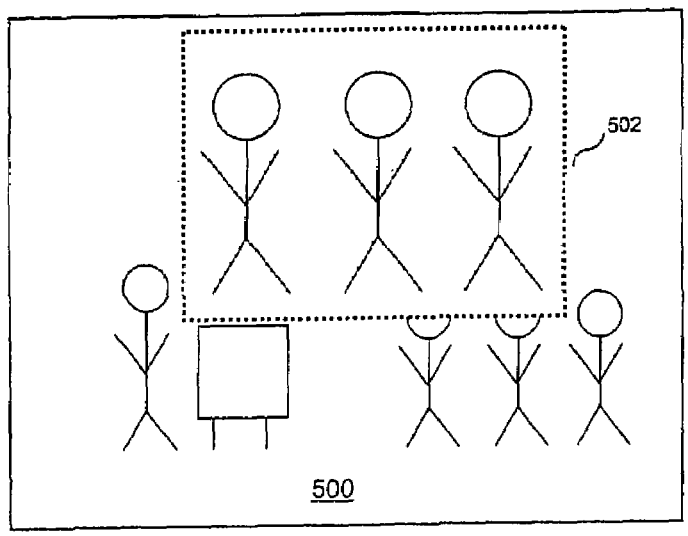
FIGS. 5A–5C illustrate display screen views with different zoomed portions.
Figure 5B:
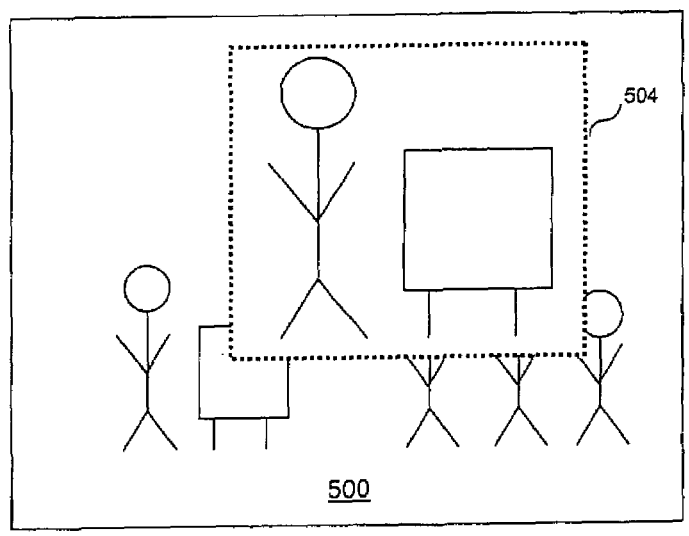
Figure 5C:
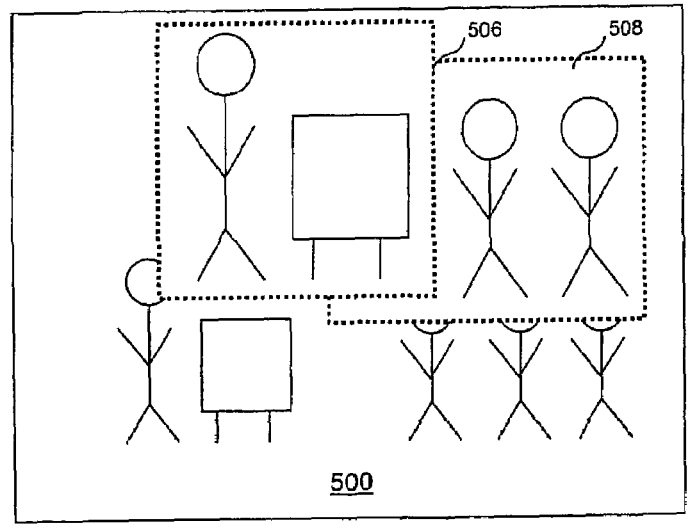

FIGS. 5A–5C illustrate display screen views with different zoomed portions that may be displayed on the video displays 418 (FIG. 4) of the different devices, depending upon the particular application and the user's interest. For example, the devices 420A, 420B, 420C that are supporting a monitoring application of the classroom via image stream S1 may be interested in displaying defined and zoomed portion 502 directed to students located in full screen view 500, as shown in FIG. 5A. For the distance learning application supported via image stream S2, students using devices 424A, 424B, 424C may be interested in displaying defined and zoomed portion 504 directed to the teacher located in full screen view 500, as shown in FIG. 5B. Likewise, the users of devices 422A, 422B, 422C for the video-on-demand application with image stream S3 may be interested in a similar defined and zoomed portion 504 as shown in FIG. 5B. However, the security personnel using device 422A may also need to monitor students. FIG. 5C shows a defined and zoomed portion 506 corresponding to the teacher and defined and zoomed portion 508 corresponding to the students. In the case of security personnel using device 422A that receives both image streams S1 (motion JPEG) and S3 (MPEGx), the portion 506 may be derived from stream S3 and portion 508 may be derived from stream S1, for example. It should be understand from the foregoing that FIG. 5C can also represent the display screen of any of the users on any of the local networks in the case where such users choose to create multiple zoomed image windows from a single video image stream.

While this invention has been particularly shown and described with references to preferred embodiments thereof, it will be understood by those skilled in the art that various changes in form and details may be made therein without departing from the scope of the invention encompassed by the appended claims. Specifically, videotelephony is not limited to Plain Old Telephone Service ("POTS") but can be implemented on other communication mediums such as cellular, DSL, cable and power line systems, as contemplated by the present invention.

What is claimed is:

1. A method for conserving bandwidth in a transmission of a videotelephony image from a far-end video image source to a near-end, the method comprising:
    defining at least two portions of the videotelephony image to be zoomed;
    zooming the defined portions by using an interpolation-based digital zooming technique at the near-end, independent of the zooming capabilities of the videotelephony image source and without requiring re-transmission of the zoomed portions from the videotelephony image source; and
    displaying each of the zoomed portions in a corresponding window.

2. The method of claim 1 wherein each zoomed portion is displayed in an in-place window over the corresponding defined portion such that the zoomed portion overlaps adjacent non-zoomed portions of the videotelephony image.

3. The method of claim 1 wherein each zoomed portion is displayed in a separate window.

4. The method of claim 3 wherein the separate window is a floating window.

5. The method of claim 3 wherein the separate window is a fixed or docked window.

6. The method of claim 1 wherein a freeze-frame technique is used to capture the zoomed image such that re-transmission of the image source does not overwrite the zoomed image.

7. The method of claim 1 wherein each zoomed portion is displayed on a separate display screen.

8. The method of claim 1 wherein each zoomed portion is displayed on the same display screen.

9. The method of claim 1 further comprising acquiring the videotelephony image with a far-end videotelephony image source that includes a wide-angle lens.

10. The method of claim 1 wherein the videotelephony image is selected from at least one of multiple image streams, each image stream encoded using a different type codec.

11. The method of claim 10 wherein defining includes defining a first portion of the videotelephony image corresponding to a first image stream and defining a second portion of the videotelephony image corresponding to a second image stream.

12. The method of claim 11 wherein the first and second zoomed portions are displayed on correspondingly different display screens.

13. The method of claim 11 wherein the first and second zoomed portions are displayed on the same display screen.

14. An apparatus for conserving bandwidth in a transmission of a videotelephony image from a far-end videotelephony image source to a near-end, the apparatus comprising:

a network interface for receiving the transmission of the videotelephony image from the videotelephony image source; and an image control processor coupled to the network interface, the image control processor defining at least two portions of the videotelephony image to be zoomed, and zooming the defined portions by using an interpolation-based digital zooming technique at the near-end, independent of the zooming capabilities of the videotelephony image source and without requiring re-transmission of the zoomed portions from the videotelephony image source.

15. The apparatus of claim 14 wherein each zoomed portion is displayed in an in-place window over the corresponding defined portion such that the zoomed portion overlaps adjacent non-zoomed portions of the videotelephony image.

16. The apparatus of claim 14 wherein each zoomed portion is displayed in a separate window on a display screen.

17. The apparatus of claim 16 wherein the separate window is a floating window on a display screen.

18. The apparatus of claim 16 wherein the separate window is a fixed or docked window on a display screen.

19. The apparatus of claim 14 wherein a freeze-frame technique is used to capture the zoomed image such that re-transmission of the image source does not overwrite the zoomed image.

20. The apparatus of claim 14 in an arrangement that includes an encoder at the far-end that encodes the videotelephony image into multiple video streams using a different type codec for each video stream.

21. The apparatus of claim 10 wherein the image processor defines a first portion of the videotelephony image corresponding to a first image stream and defines a second portion of the videotelephony image corresponding to a second image stream.

22. The apparatus of claim 21 wherein the first and second zoomed portions are displayed on correspondingly different display screens.

23. The apparatus of claim 21 wherein the first and second zoomed portions are displayed on the same display screen.

24. An apparatus for conserving bandwidth in a transmission of a videotelephony image from a far-end videotelephony image source to a near-end, the apparatus comprising:

means for defining at least two portions of the videotelephony image to be zoomed; and means for zooming the defined portions by using an interpolation-based digital zooming technique at the near-end, independent of the zooming capabilities of the videotelephony image source and without requiring re-transmission of the zoomed portions from the videotelephony image source.

25. A computer program product comprising:

a computer usable medium for conserving bandwidth in a transmission of a videotelephony image from a far-end videotelephony image source to a near-end;

a set of computer program instructions embodied on the computer usable medium, including instructions to:

define at least two portions of the videotelephony image to be zoomed;

zoom the defined portions by using an interpolation-based digital zooming technique at the near-end, independent of the zooming capabilities of the videotelephony image source and without requiring re-transmission of the zoomed portions from the videotelephony image source; and display each of the zoomed portions in a corresponding window on a display screen.

26. A computer data signal embodied in a carrier wave comprising a code segment for conserving bandwidth in a transmission of a videotelephony image from a far-end videotelephony image source to a near-end, including instructions to:

define at least two portions of the videotelephony image to be zoomed;

zoom the defined portions by using an interpolation-based digital zooming technique at the near-end, independent of the zooming capabilities of the videotelephony image source and without requiring re-transmission of the zoomed portions from the videotelephony image source; and display each of the zoomed portions in a corresponding window on a display screen.

27. A method for conserving bandwidth in a transmission of a videotelephony image from a far-end videotelephony image source to a near-end, the method comprising:

defining a portion of the videotelephony image to be zoomed;

zooming the defined portion by using an interpolation-based digital zooming technique at the near-end, independent of the zooming capabilities of the videotelephony image source and without requiring re-transmission of the zoomed portion from the videotelephony image source; and displaying the zoomed portion in a window on a display screen.

28. The method of claim 27 wherein the zoomed portion is displayed in an in-place window over the defined portion such that the zoomed portion overlaps adjacent non-zoomed portions of the videotelephony image.

29. The method of claim 27 wherein the zoomed portion is displayed in a separate window on the display screen.

30. The method of claim 29 wherein the separate window is a floating window on the display screen.

31. The method of claim 29 wherein the separate window is a fixed or docked window on the display screen.

32. The method of claim 27 wherein a freeze-frame technique is used to capture the zoomed image such that re-transmission of the image source does not overwrite the zoomed image.

33. An apparatus for conserving bandwidth in a transmission of a videotelephony image from a far-end videotelephony image source to a near-end, the apparatus comprising:

a network interface for receiving the transmission of the videotelephony image from the videotelephony image source; and an image control processor coupled to the network interface, the image control processor defining a portion of the videotelephony image to be zoomed, and zooming the defined portion by using an interpolation-based digital zooming technique at the near-end, independent of the zooming capabilities of the videotelephony image source and without requiring re-transmission of the zoomed portion from the videotelephony image source.

34. The apparatus of claim 33 wherein the zoomed portion is displayed in an in-place window over the defined portion such that the zoomed portion overlaps adjacent non-zoomed portions of the videotelephony image.

35. The apparatus of claim 33 wherein the zoomed portion is displayed in a separate window on a display screen.

36. The apparatus of claim 35 wherein the separate window is a floating window on a display screen.

37. The apparatus of claim 35 wherein the separate window is a fixed or docked window on a display screen.

38. The apparatus of claim 35 wherein a freeze-frame technique is used to capture the zoomed image such that re-transmission of the image source does not overwrite the zoomed image.

39. An apparatus for conserving bandwidth in a transmission of a videotelephony image from a far-end videotelephony image source to a near-end, the apparatus comprising:
 means for defining a portion of the videotelephony image to be zoomed;
 means for zooming the defined portion by using an interpolation-based digital zooming technique at the near-end, independent of the zooming capabilities of the videotelephony image source and without requiring re-transmission of the zoomed portion from the videotelephony image source.

40. A computer program product comprising:
 a computer usable medium for conserving bandwidth in a transmission of a videotelephony image from a far-end videotelephony image source to a near-end;
 a set of computer program instructions embodied on the computer usable medium, including instructions to:
 define a portion of the videotelephony image to be zoomed;
 zoom the defined portion by using an interpolation-based digital zooming technique at the near-end, independent of the zooming capabilities of the videotelephony image source and without requiring re-transmission of the zoomed portion from the videotelephony image source; and
 display the zoomed portion in a window on a display screen.

41. A computer data signal embodied in a carrier wave comprising a code segment for conserving bandwidth in a transmission of a videotelephony image from a far-end videotelephony image source to a near-end, including instructions to:
 define a portion of the videotelephony image to be zoomed;
 zoom the defined portion by using an interpolation-based digital zooming technique at the near-end, independent of the zooming capabilities of the videotelephony image source and without requiring re-transmission of the zoomed portion from the videotelephony image source; and
 display the zoomed portion in a window on a display screen.

* * * * *